US007685463B1

(12) United States Patent
Linnell

(10) Patent No.: US 7,685,463 B1
(45) Date of Patent: Mar. 23, 2010

(54) DISK DRIVE MANAGEMENT SYSTEM

(75) Inventor: Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 696 days.

(21) Appl. No.: 11/474,192

(22) Filed: Jun. 23, 2006

(51) Int. Cl.
 *G06F 11/00* (2006.01)
(52) U.S. Cl. .............................................. 714/7; 714/5
(58) Field of Classification Search ................... 714/5–7
 See application file for complete search history.

(56) References Cited

U.S. PATENT DOCUMENTS

| 6,598,174 | B1 * | 7/2003 | Parks et al. ..................... 714/6 |
| 7,389,379 | B1 * | 6/2008 | Goel et al. .................. 711/112 |
| 7,464,290 | B2 * | 12/2008 | Chien ............................ 714/7 |
| 2003/0005354 | A1 * | 1/2003 | Kalman ......................... 714/7 |
| 2006/0015771 | A1 * | 1/2006 | Van Gundy et al. ............. 714/7 |
| 2006/0036903 | A1 * | 2/2006 | Dubal et al. .................... 714/7 |
| 2006/0048001 | A1 * | 3/2006 | Honda et al. ................... 714/7 |
| 2006/0107103 | A1 * | 5/2006 | Rodrigues et al. .............. 714/7 |
| 2007/0101183 | A1 * | 5/2007 | Rodrigues et al. .............. 714/5 |

* cited by examiner

*Primary Examiner*—Marc Duncan
(74) *Attorney, Agent, or Firm*—Krishnendu Gupta; Scott A. Ouellette

(57) ABSTRACT

A disk drive management system includes a data storage device including an array of disk drives and a host computer for controlling the operation of the data storage device. The array of disk drives includes an operational drive pool including a number of online disk drives having data written to and read from by the host computer; a spares drive pool including a number of disk drives that are configured to be included in the operational drive group, but are offline while in the spares group; and a maintenance drive pool including a maintenance manager for testing faulty disk drives from the operational drive pool. When a faulty drive is transitioned from the operational drive pool upon the occurrence of a particular error, a disk drive from the spares drive pool is transitioned to the operational drive pool to take the place of the faulty drive.

10 Claims, 5 Drawing Sheets

DISK DRIVE MANAGEMENT SYSTEM

FIELD OF THE INVENTION

This invention relates generally to data storage systems, and more particularly to a disk drive management system that enables operating status of disk drives to be managed while the data storage system is operating and online.

BACKGROUND OF THE INVENTION

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system. Here an array of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the array of disk drives in such a way that the host computer/server merely thinks it is operating with its own local disk drive. One such system is described in U.S. Pat. No. 7,007,194, entitled "Data Storage System Having Point-to-Point Configuration", Wilson et al., issued Feb. 28, 2006, assigned to the same assignee as the present invention, and incorporated herein by reference in its entirety.

In the current practice, disk drives are installed in the array by updating a configuration file in the system, physically installing drives in the correct locations, and performing initialization routines to properly format the drives to accept user data. Once placed into the system, these new drives are considered fully capable, operational units, and if they are unable to complete the initialization commands properly, then they are diagnosed as bad, and the installation is considered a failure, since the physical configuration does not match the expected configuration due to the missing units.

New drives may fail the installation process for various reasons: there may have been handling damage between the factory and the customer location, the format may be incorrect, there may be a previously undetected fault within the drive, or a software bug may be present. The existing process is unable to cope with any of these potential problems, the normal recourse being to order a replacement drive for the failed unit and repeat the process once the replacement has arrived. This is a time-consuming and expensive process.

Once successfully installed, the drives will provide their expected functions through their normal lifetime. Over time, however, some of the drives will encounter errors. If the errors are serious enough, the policies in the array will choose to stop using some of these drives. The current practice for high-availability systems is to repair such a failure in a minimum amount of time, in order to minimize the time at which the affected part of the system runs "exposed", i.e., the design level of redundancy is temporarily lost, and if another failure occurs within the repair window, the user may experience a disruption in access to this data. To minimize the repair window, the system may be configured with one or more spare drives that is available to be used to replace any other failed drive in the system, and this spare drive is invoked automatically and immediately upon detection of a failure. Even so, once the spare is consumed, the system must be repaired by replacing the failed drive to return the system to normal levels of redundancy and protection. As the cost of hardware drops in terms of unit cost, the relative cost of servicing the failure increases over time.

Another issue worth mentioning is that the diagnosis of a drive problem must be done while the drive is still considered part of the system, placing severe constraints on the types of operations, response times, and decision time for determining whether to continue to utilize the drive or not, since the host system software places tight constraints on responses to its commands.

tegory of errors is those which may be transient in nature, or may be caused by software bugs within the drive itself. These errors may masquerade themselves as hardware errors, and once the drive is replaced and returned to the factory, a retest may find that there is nothing permanently wrong with the drive. This process adds unnecessary cost and wear and tear, and can expose the system to other errors, since there are well known error rates for the service actions themselves.

One way to reduce the error rate due to software problems discovered within the drive subsystem would be to update the software periodically, however, in a high-availability system this is difficult to do, since the drive software update process requires that the drive be made unavailable to the user for a period of time while the software is upgraded.

SUMMARY OF THE INVENTION

The present invention is directed to a disk drive management system of a data storage system that allocates numbers of disk drives into groups or "pools" of drives to insulate disk drive change management from online configurations of disk drives. These pools are delineated by the functions and operations that are carried out within each pool. For example, the pools may include at least a pool of new drives, a pool of spare drives, a pool of operational drives, a pool of faulted drives and a maintenance pool of drives. Well defined and rigorously controlled transitions of the drives in each pool are allowed between pools. The concept of drive sparing described above is expanded to encompass a large group that occupies one of these pools in its entirety.

BRIEF DESCRIPTION OF THE DRAWINGS

These and other features of the invention will become more readily apparent from the following detailed description when read together with the accompanying drawings, in which.

DETAILED DESCRIPTION

The data storage system of the present invention allocates the disk drives in its disk drive array into a number of drive groups or pools. Each pool serves a specific purpose and drives may be transferred between pools as the operational status of each drive changes. In a preferred embodiment of the invention, the available drive pools to which disk drives are allocated are the "new" or "install" drive pool, the "maintenance" drive pool, the "spares" drive pool, the "operational" drive pool and the "failed" drive pool.

Figure 1:
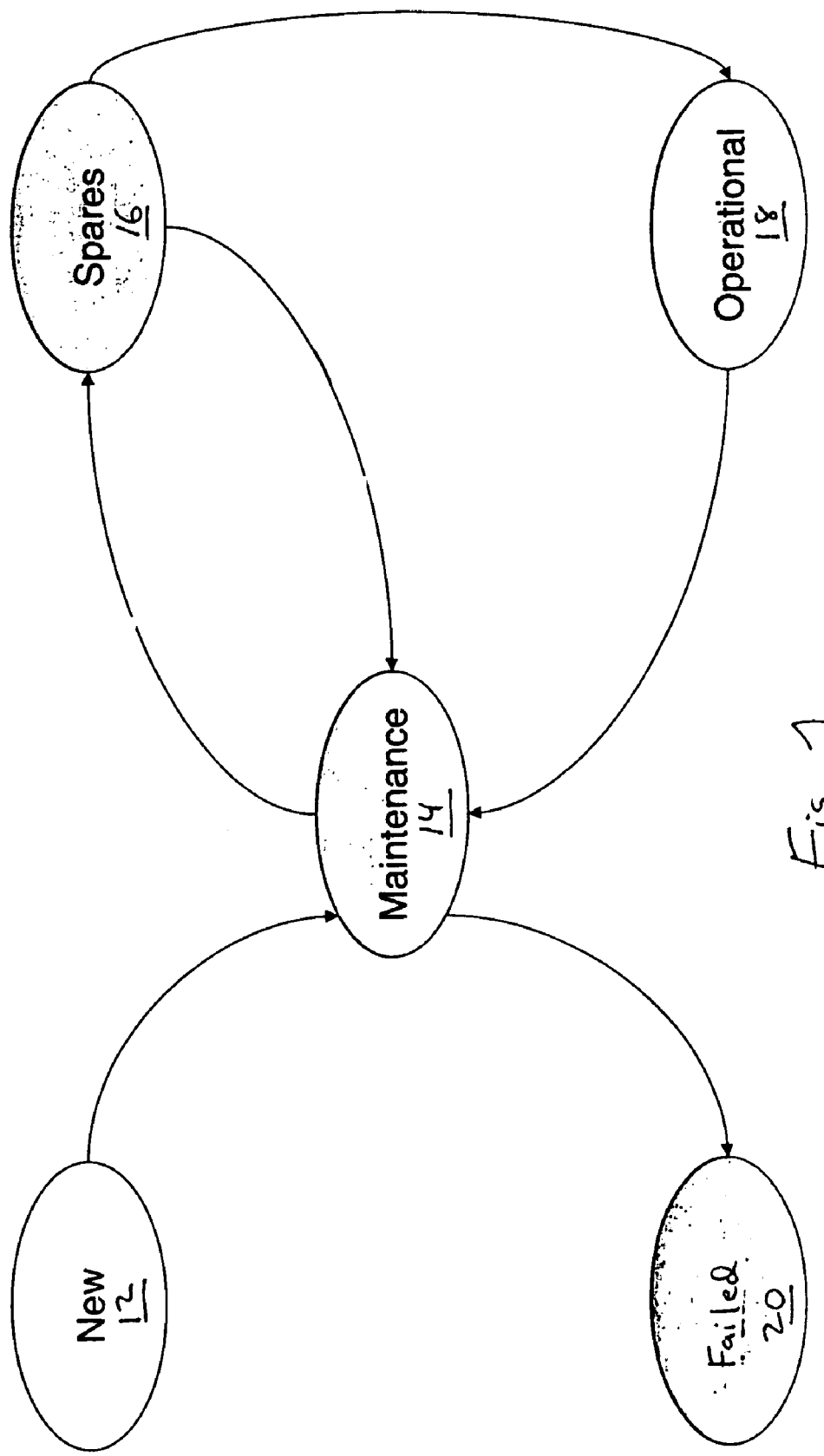
FIG. 1 is a state diagram of the drive pools in accordance with the present invention.
Figure 2:
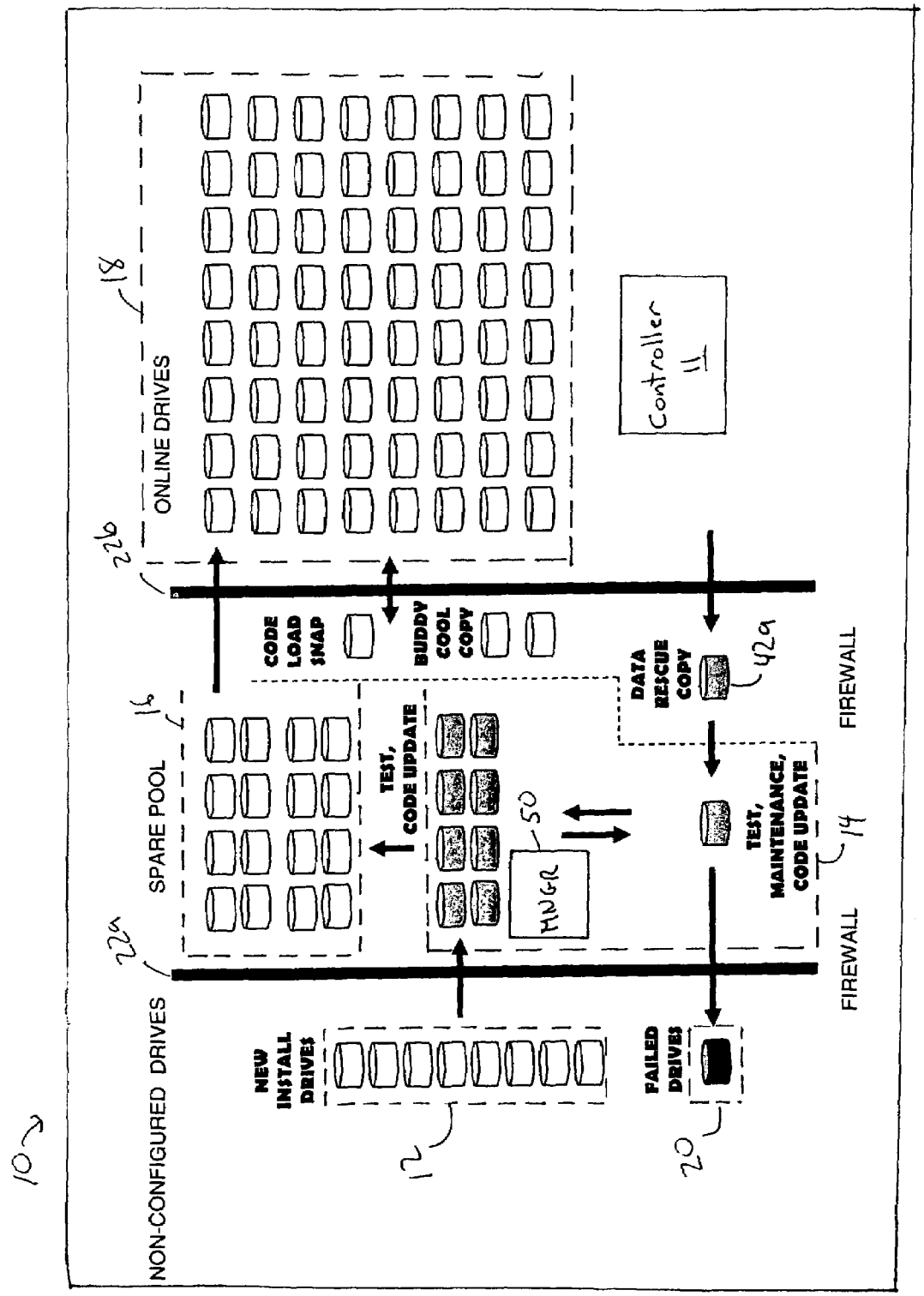
FIG. 2 is a schematic diagram showing the configuration of the drive pools in accordance with the present invention.

FIG. 1 is a state diagram that illustrates the possible state changes that a disk drive can undertake as the drive's status changes. FIG. 2 is a schematic diagram of a disk drive array 10 having disk drives allocated to different pools in accordance with the present invention. The disk drive array 10 is operated under the control of a controller 11 which includes the necessary logic to carry out the implementation of the invention described herein. The five drive pools of a preferred embodiment of the invention are shown in FIGS. 1 and 2. A more detailed description of the potential "transitioning" of a drive through the pools is set forth below with reference to FIGS. 3A-3C. When a drive is first installed into the disk drive array, it is allocated to the "new" or "install" pool 12. The drives are not available for configuring as user-accessible volumes in this state. The system will treat drives in this pool as untested devices, which must be checked for proper code level, proper device type, format, and will have several test routines run on them to insure that there are no defects that would compromise normal operation. The drives will also have a standard data image written and verified on them, making them available to transition to other pools. As part of a New/Install pool test and checkout, the drive slot of the array into which the drive is installed must also be tested and verified for proper operation prior to promotion of the drive from the new pool 12 to the spare pool 16.

When a drive located in the new pool 12 is to be transitioned to the spare pool 16, it must first be allocated to the maintenance pool 14. The maintenance pool 14 is where a drive is evaluated for proper code level, has extensive diagnostic tests run on it, and is determined to be fit for further operation in the system. Once the maintenance pool 14 has tested a disk drive and determined that it is fit for operational status, the disk drive is transitioned to the spare pool 16.

The spare pool 16 is the pool in which disk drives that are operationally fit but not currently configured in the operational state reside. These disk drives are available for assuming operational status (e.g., transition to the operational pool 18) at any time. As described further below, the transition from the spare pool 16 to the operational pool 18 may be due to a drive upgrade i.e., the system configuration is expanded; a drive replacement, wherein a failed drive is removed from the operational pool 18 and moved to the maintenance pool 14.

The operational pool 18 is the pool in which drives are available for the normal data storage and retrieval functions of configuration, access, replication, etc. of data.

When a disk drive in the operational pool 18 is detected by the data storage system as having failed or as experiencing operational problems, the disk drive is transitioned to the maintenance pool 14 for testing. If testing in the maintenance pool 14 determines that the disk drive is not serviceable by the maintenance pool 14, it is transitioned to the failed pool 20, where it can be held for return to the manufacturer for repair or replacement.

These policies, as previously described, act to form a firewall 22a, as shown in FIG. 2, that separates the new pool 12 and the failed pool 20 from the maintenance pool 14 and the spares pool 16. Likewise, these policies serve to act as a firewall 22b that separates the maintenance pool 14 and the spares pool 16 from the operational pool 18. These firewalls act to insulate the online drives in the operational pool 18 from drive activities occurring in the other drive pools.

The operation of a preferred embodiment of the invention will be described with reference to the flow diagrams shown in FIGS. 3A-3C. As shown in each of FIGS. 3A-3C, each step that takes place within maintenance pool 14 is included within a dashed-line box labeled 14a. Operation of the maintenance pool 14 is controlled by a maintenance pool manager 50, which includes the necessary logic to carry out the implementation of the maintenance pool described herein. Maintenance pool manager 50 operates under the control of controller 11.

Beginning at Step 30, the disk drive array system is powered up. Each drive within operational pool 18 undergoes initial testing, Step 32, to establish the basic communication link between the drive and the controller 11, so that the drive can be queried as to drive type and code revision. If a drive passes the initial testing, its configuration code level is validated, Step 34. In this step, the configuration code on the drive is checked against a configuration file 36, which may be part of a configuration file update 38 sent to the manager 50 from the host. If the configuration of the disk drive is determined to be valid, the disk drive is maintained within operational pool 18 for service. While the drive is in the operational pool 18, diagnostic tests are periodically performed on the disk drive, Step 40, to determine whether a code update is available, if the disk drive is experiencing errors or is in need of maintenance.

Figure 3A:
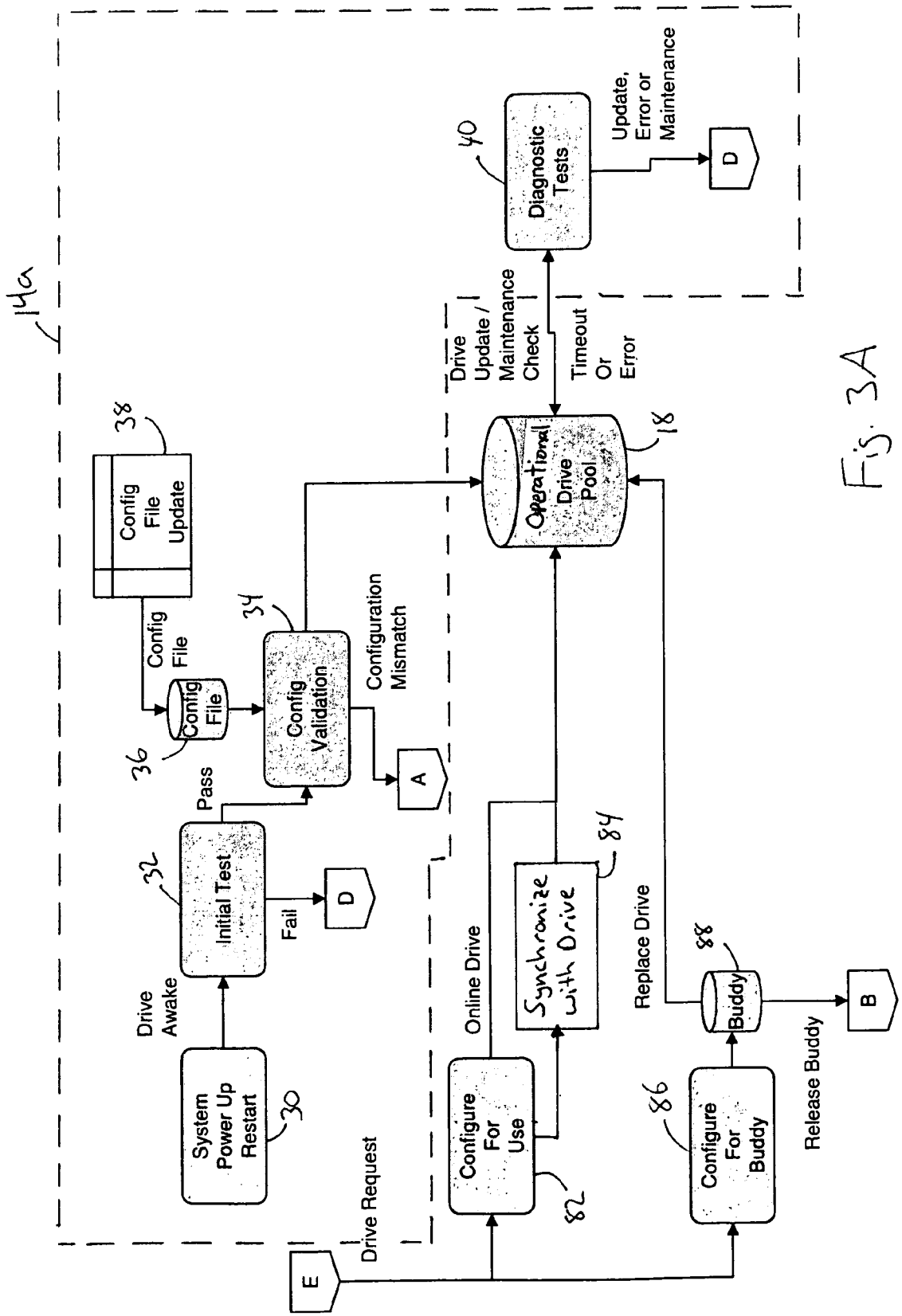
FIGS. 3A-3C combine to form a flow diagram showing the transition of drives through each of the drive pools in accordance with the present invention.
Figure 3B:
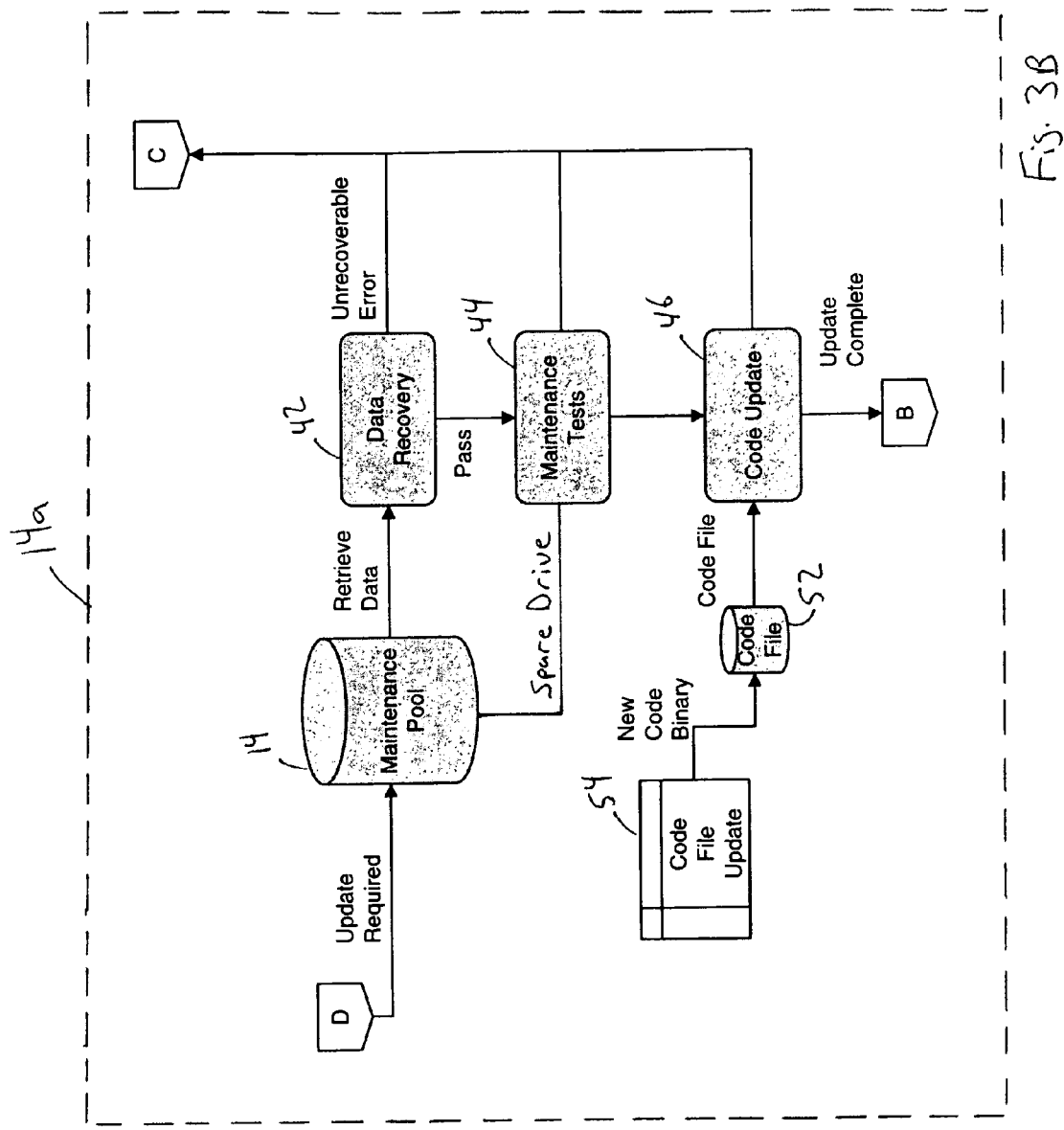

If, in Step 40, one of the foregoing actions is required, the drive is moved to the maintenance pool 14, FIG. 3B. To maintain full system integrity, the system then requests a drive be moved from the spare pool 16 to the operational pool 18 to backfill the failed drive.

Another function of the maintenance pool is to attempt data rescue on drives that have been removed from the operational pool 18 because of detected problems. There is a significant class of reported drive problems that make a particular drive unsuitable for general read/write operation, but may allow read-only access to operate with a high-degree of success. By recovering data in this manner, the burden of rebuilding data from the remaining members of a redundancy group to which the drive belonged is reduced and/or eliminated.

In Step 42, therefore, an attempt to recover the data stored on the drive that was removed from the operational pool 18 is made and, if the attempt is successful, the data is stored on the drive that took the removed drive's place in the operational pool 18. The disk drive for which the data recovery is attempted in Step 42 is schematically shown at 42a in FIG. 2.

If the data is successfully recovered from the disk drive in Step 42, maintenance tests are then performed on the disk drive, Step 44, to diagnose any problems that might be occurring in the disk drive. If the disk drive passes the maintenance tests in Step 44, the maintenance pool manager 50 determines whether a code update is necessary, Step 48 In this step, the code on the drive is checked against a code file 52, which may be part of a code file update 54 sent to the manager 50 from the host. Once Step 46 is completed successfully, the drive is returned to the spare pool 16, FIG. 3C, for future service.

If, in either of Steps 42, 44 or 46, an unrecoverable error is found which prevents the completion of that step, the drive is transitioned to the failed pool 20, FIG. 3C, where, at some later time, the drive can be physically removed from the array 10 for service, Step 56.

Figure 3C:
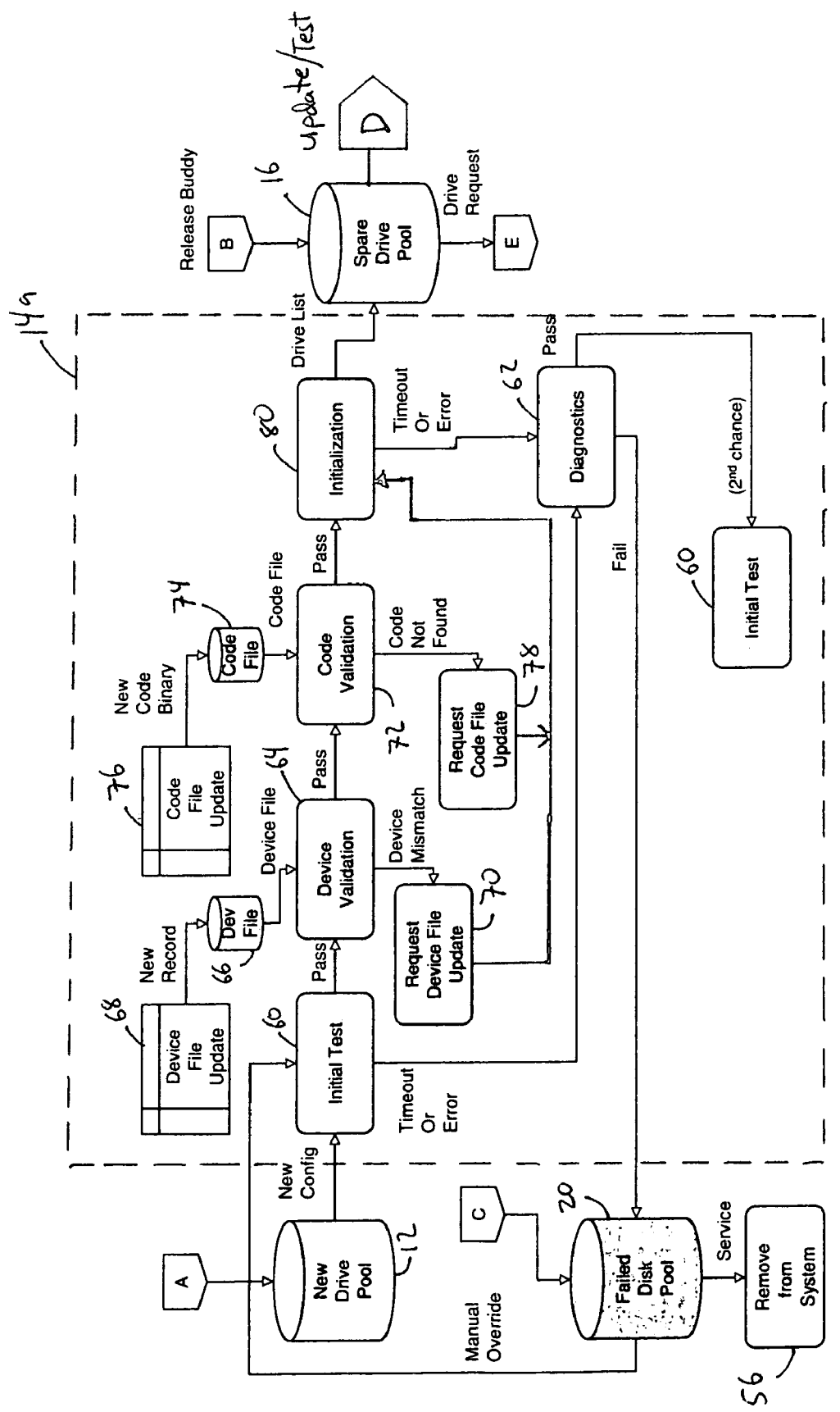

If, in Step 32, FIG. 3A, the drive fails the initial test, it is transitioned to the maintenance pool 14, FIG. 3B, and Steps 42-46 are performed on the drive to determine the reason for the failure and to transition the drive either to the spare pool 16, FIG. 3C, or to the failed pool 20, FIG. 3C.

If, in Step 34, it is determined that the configuration of the disk drive is invalid, the disk drive is transitioned to the new pool 12, FIG. 3C. From the new drive pool 12, the disk drive can be transitioned in to the maintenance pool 14a, where it undergoes initial testing, Step 62, which similar to the initial testing carried out in Step 32, and, if it fails the initial testing, it undergoes diagnostics, Step 62.

If the disk drive passes the diagnostics in Step 62, it is returned to the initial testing step, Step 60, to retry the initial testing. If the disk drive fails the diagnostics in Step 62, it is transitioned to the failed pool 20, where, at some later time, the drive can be physically removed from the array 10 for service, Step 56.

After a disk drive passes the initial test in Step 60, the device type of the disk drive is validated, Step 64, to insure that the disk drive is of the proper type for the particular application to which it will be assigned. In this step, the device type of the disk drive is checked against a device file 66, for checking, for example, loading operational parameters, correct configuration bits, etc. The device file 66 may be part of a device file update 68 sent to the manager 50 from the host. If the device type of the disk drive is determined to be valid, the code level of the disk drive is validated, Step 72, to insure that the code level of the disk drive is up to date for the particular application to which it will be assigned. In this step, the code level of the disk drive is checked against a code file 74, which may be part of a code file update 76 sent to the manager 50 from the host. If the device type of the disk drive is determined to be valid, the disk drive is initialized, Step 80, and transitioned to the spare pool 16.

If, in Step 64, the device type of the disk drive does not match the device type indicated in the device file 66, manager 50 requests a device file update from the controller 11 to apply to the disk drive, Step 70. Once the device file update is applied to the disk drive, the disk drive is passed to Step 72 for code validation. If, in Step 72, the disk drive does not include the code indicated in the code file 74, manager 50 requests a code file update from the controller 11 to apply to the disk drive, Step 72. Once the device file update is applied to the disk drive, the disk drive is passed to Step 80 for initialization. If, during the initialization step, the system experiences an error or times out, the drive will undergo the diagnostics in Step 62 and proceed as previously described. Once the disk drive is initialized, it is transitioned to the spares pool 16 to await deployment into the operational pool 18 when necessary.

A disk drive can be requested from the spares pool 16, for several reasons. A disk drive can be requested from the spares pool 16 after a disk drive has been removed from the operational pool 18 for maintenance, updates or errors. A disk drive can be requested from the spare pool 16 for a transparent drive code update, i.e., when the data storage array system policy dictates that a drive in the operational pool 18 needs to have a software update, a spare drive is attached to it and the data on the drive is copied to the spare. Once the spare is synchronized, it assumes the identity of the drive to be updated, and the original drive is transitioned to the maintenance pool 14. Once that disk drive has been updated and tested, it is transitioned to into the spares pool 16, where it would be available to be used to replace any other drive in operational pool 18. Further, a disk drive can be requested from the spares pool 16 for a "buddy cool" data copy. If the data storage array system monitoring routines determine that a particular drive may be at higher risk than average for failure, a spare drive may be "attached" to and synchronized with the at-risk disk drive. Once this is done, the drive can continue to "shadow" the at-risk disk drive, or the at-risk drive can be transitioned to the maintenance pool 14 to have testing performed. Since the attached spare is pre-emptive, it is still available to be used to replace an actual failure, in the event that another disk drive fails prior to the at-risk disk drive.

Returning to FIG. 3C, when a drive is requested from the spares pool 16 for the purpose of replacing a drive that has been removed from the operational pool 18, the drive is configured for use, Step 82, FIG. 3A, and transitioned into the operational pool 18. When a drive is requested from the spares pool 16 for the purpose of performing a transparent drive code update, after the drive is configured in Step 82, it is synchronized with the drive marked for update as described above, Step 84, and then the drive is transitioned to the operational pool 18. When a drive is requested from the spare pool 16 for the purpose of performing a buddy cool update, the drive is configured for operation as a buddy drive, Step 86, and then operates as a buddy drive 88 by shadowing the attached drive in the operational pool 18. When the buddy copy is no longer needed, it is transitioned back into the spares pool 16.

Further, if a drive in the spares pool 16 needs to be tested or updated, it is transitioned to the maintenance pool 14, FIG. 3B and run through Steps 44 and 46 before being returned to the spares pool 16.

Once a system is designed and implemented with the drive pools described above, the following characteristics become realizable:

- Large numbers of drives can be placed into the spares pool 16 to allow automatic repair and recovery from multiple drive faults, without requiring visits by service personnel.
- The only transition of drives into the operational pool 18 is from the spares pool 16. Both drive replacements and physical drive adds are accomplished by assigning spare drives from the spares pool 16 to configured drive positions in the operational pool 18.
- Individual servicing of drive failures is no longer necessary. Drives can be removed from the failed pool 20 in groups periodically, and new drives installed into the new pool 12. The system will transition these new drives into the spares pool 16 automatically, making them available for future repairs.
- Repair cycles due to drive failures are decoupled from the response/arrival time of a customer service engineer, allowing reductions in the need for service calls during non-business hours, for example.
- The visitation rate for replenishment can be adjusted to customer or support level preference by adjusting the size of the spares pool against the system configuration and experience level, accordingly.
- Drive code updates can occur in the background, with no scheduled downtime or other loss of availability to the customer.
- The system is more tolerant of transient and software-induced failures, since drives can be retested and verified in the system.
- The ability of the system to repair the loss of a drive is enhanced by the fact that the repair takes place without physically removing the drive—making this drive available for recovering the original data for cases where the fault does not affect the drive's ability to read.
- The returned drive "No Trouble Found" and "Can Not Duplicate Error" rates will be diminished due to the additional testing and checkout routines run prior to causing a drive to be removed from the system.
- Drive upgrade processes can be simplified and made more flexible, since the drives can be installed transparently into the system (without scheduling special windows) anytime prior to needing them, as the drives will be placed into the spares pool 16 until needed. Once available in the spares pool 16, the drives can be more easily and confidently be added to the operational pool 18, since they have already been extensively checked for proper operation within the system.

Drive repair processes do not depend on the presence of dial-in/dial-out capability, which is advantageous for secure datacenter sites.

Drives in the spares pool 16 can be tested, scanned and have their code upgraded without affecting online drive activity in the operational pool 18.

The physical replacement of drives is only allowed on drives in the failed pool 20, which are isolated from online activity in the operational pool 18.

The system tolerance to errors during service visits is increased, since the repair actions, such as removing drives from the failed pool 20 and installing drives into the new pool 12, will be performed on an array at full levels of protection and redundancy, as opposed to replacing a failed drive in a degraded RAID group, where a single mistake (such as physically removing the wrong drive in the group) may create a multiple fault condition that will disrupt customer operations.

For large, multi-tiered systems, where several classes of disks may co-exist within the configuration (e.g., enterprise, near-line, archival), multiple "planes" may exist, with each plane composed of a separate set of pools, each plane governed by a separate set of policies.

It will be understood that the disk drives in each drive pool are transitioned between pools by changing the operating status of the drive, as described above, to configure the drive for operation in the drive pool to which it is being transitioned. Preferably, disk drives are only physically removed from the data storage system after they have been transitioned to the failed drive pool and have therefore been marked for repair or replacement by a service technician. Disk drive may be removed from the failed drive pool at periodic intervals, in order to reduce the amount of service calls required by a service technician.

In one embodiment, the disclosed method for managing a data storage system may be implemented as a computer program product for use with a computer system that includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Such implementation may include a series of computer instructions fixed either on a tangible medium, such as a computer readable medium (e.g., a DVD, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The invention may be embodied in other specific forms without departing from the spirit or essential characteristics thereof. For example, the number of drives in each drive pool can vary greatly and will be determined by the particular user's requirements in the data storage array. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A disk drive management system comprising:
a data storage device including an array of disk drives;
a host computer for controlling the operation of the data storage device;
the array of disk drives including:
an operational drive pool including a number of online disk drives having data written to and read from by the host computer;
a spares drive pool including a number of disk drives that are configured to be included in the operational drive group, but are offline while in the spares group;
a maintenance drive pool including a maintenance manager for testing faulty disk drives from the operational drive pool; and
a failed drive pool for receiving disk drives transitioned from the maintenance drive pool after testing conducted by the maintenance drive pool determines that a drive has failed;
wherein, when a faulty drive is transitioned from the operational drive pool upon the occurrence of a particular error, a disk drive from the spares drive pool is transitioned to the operational drive pool to take the place of the faulty drive; and
wherein disk drives in the failed drive pool are removed for service at periodic intervals.

2. The disk drive management system of claim 1 further including a new drive pool for including a number of disk drives that are available for use by the data storage device, but have not yet been configured for use.

3. The disk drive management system of claim 2 wherein, when a drive is to be added to the spares drive pool, the maintenance manager transitions a disk drive in the new drive pool to the maintenance drive pool, performs an initialization process on the disk drive, and transitions the disk drive to the spares drive pool.

4. The disk drive management system of claim 2 wherein the maintenance manager configures a disk drive in the new drive pool for operation in the operational drive group and transitions the configured drive to the spares pool.

5. The disk drive management system of claim 1 wherein, when a first disk drive in the operational drive pool requires a code update, the maintenance manager configures a second disk drive in the spares drive pool to receive the data stored on the first disk drive, transitions the second disk drive into the operational drive pool to replace the first disk drive, transitions the first disk drive to the maintenance drive pool, performs the code update on the first disk drive, and transitions the first disk drive to the spares drive pool.

6. The disk drive management system of claim 1 wherein, when a particular disk drive in the spares drive pool requires a code update, the maintenance manager transitions the particular disk drive to the maintenance drive pool, performs the code update on the particular disk drive, and transitions the first disk drive back to the spares drive pool.

7. A disk drive management system comprising:
   a data storage device including an array of disk drives;
   a host computer for controlling the operation of the data storage device;
   the array of disk drives including:
      an operational drive pool including a number of online disk drives having data written to and read from by the host computer;
      a spares drive pool including a number of disk drives that are configured to be included in the operational drive group, but are offline while in the spares group;
      a new drive pool for including a number of disk drives that are available for use by the data storage device, but have not yet been configured for use; and
      a maintenance drive pool including a maintenance manager;
   wherein, when a first disk drive in the operational drive pool requires a code update, the maintenance manager configures a second disk drive in the spares drive pool to receive the data stored on the first disk drive, transitions the second disk drive into the operational drive pool to replace the first disk drive, transitions the first disk drive to the maintenance drive pool, performs the code update on the first disk drive, and transitions the first disk drive to the spares drive pool.

8. The disk drive management system of claim 7 wherein the maintenance manager configures a disk drive in the new drive pool for operation in the operational drive group and transitions the configured drive to the spares pool.

9. The disk drive management system of claim 7 wherein, when a particular disk drive in the spares drive pool requires a code update, the maintenance manager transitions the particular disk drive to the maintenance drive pool, performs the code update on the particular disk drive, and transitions the particular disk drive back to the spares drive pool.

10. The disk drive management system of claim 7 wherein, when a drive is to be added to the spares drive pool, the maintenance manager transitions a disk drive in the new drive pool to the maintenance drive pool, performs an initialization process on the disk drive, and transitions the disk drive to the spares drive pool.

* * * * *